(12) United States Patent
Sengupta et al.

(10) Patent No.: US 7,965,674 B2
(45) Date of Patent: Jun. 21, 2011

(54) SUB-SEGMENT BASED TRANSPORT LAYER PROTOCOL FOR WIRELESS MEDIUM

(75) Inventors: Somenath Sengupta, Edison, NJ (US); Nirwan Ansari, Montville, NJ (US)

(73) Assignee: New Jersey Institute of Technology NJ (US)

( * ) Notice: Subject to any disclaimer, the term of this patent is extended or adjusted under 35 U.S.C. 154(b) by 1301 days.

(21) Appl. No.: 11/121,153

(22) Filed: May 3, 2005

(65) Prior Publication Data
US 2005/0265353 A1 Dec. 1, 2005

Related U.S. Application Data

(60) Provisional application No. 60/568,506, filed on May 5, 2004.

(51) Int. Cl.
*H04W 4/00* (2009.01)
(52) U.S. Cl. .......... 370/328; 370/338; 370/474
(58) Field of Classification Search .......... None
See application file for complete search history.

(56) References Cited

U.S. PATENT DOCUMENTS

| | | | |
|---|---|---|---|
| 6,341,129 B1 * | 1/2002 | Schroeder et al. | 370/354 |
| 6,847,633 B1 * | 1/2005 | Ryu et al. | 370/352 |
| 7,043,677 B1 * | 5/2006 | Li | 714/758 |
| 7,134,070 B2 * | 11/2006 | Thakur et al. | 714/807 |
| 7,586,948 B2 * | 9/2009 | Hiddink et al. | 370/473 |
| 2005/0152359 A1 * | 7/2005 | Giesberts et al. | 370/389 |
| 2007/0076680 A1 * | 4/2007 | Amram et al. | 370/349 |

OTHER PUBLICATIONS

F.M. Anjuman and L. Tassiulas, "On the Behavior of different tcp algorithm over a wireless channel," 155-165, Atlanta, May 1999, ACM Sigmetrics.

H. Balakrishnan et al., "A comparison of mechanism for improving tcp performance over wireless links", IEEE/ACM Transactions on Networking, Dec. 1997, 756-769. vol. 5, No. 6.

R. Caceres and L. Iftode, "Improving reliable transport protocols in mobile computing environment", IEEE JSAC, Jun. 1995, pp. 850-857, vol. 13, No. 5.

M. Junti and Latva-Aho, Bit-Error Probablity Analysis of Linear Receivers for CDMA Systems in Frequency Selective Fading Channels, IEEE Transactions on Communications, Dec. 1999, pp. 1788-1791, vol. 47, No. 12.

Bakre and Badrinath, "I-TCP: Indirect TCP for Mobile Hosts," 15th Int'l Conf. on distributed Computing Systems (ICDCS), May 1995, pp. 136-143.

Stone and Partridge, "When the CRC and TCP Checksum Disagree. ACM SIGCOMM," Sep. 2000.

H. Inamura et al., RFC 3481, TCP over 2.5 G and 3G Wireless Networks, The Internet Society, 2003, pp. 1-21.

H. Balakrishnan et al., Improving reliable transport and handoff performance in cellular wireless networks, ACM Wireless Networks, Dec. 14, 1995, 469-481.

* cited by examiner

*Primary Examiner* — Pankaj Kumar
*Assistant Examiner* — Marcus R Smith
(74) *Attorney, Agent, or Firm* — Connolly Bove Lodge & Hutz LLP

(57) ABSTRACT

The invention enables the use of TCP protocol for reliable transport of data over a wireless network, resolving the problems associated with frequent packet loss. Additional benefits include delivery of significant performance improvement, bandwidth saving and backward compatibility compared to the wire-line TCP protocol, and contribution to power savings in wireless handsets and devices. To make the retransmission process more granular, transport layer segments are subdivided into sub-segments. The invention utilizes a split TCP based approach and produces a series of smaller-sized segments that share the same transport layer header. A NACK-based message exchange, a new header format and a special windowing protocol are used to achieve reliability, flow-control, and efficient buffer handling.

13 Claims, 6 Drawing Sheets

| Payload | Correlation ID Size:16 bits | Segment # Size:32 bits | Sub-Segment# Size:4bits | Checksum Size:16 bits |
|---|---|---|---|---|

| Payload | Correlation ID Size:16 bits | Segment # Size:32 bits | Sub-Segment# Size:4bits | Checksum Size:16 bits |

Figure 4

SUB-SEGMENT BASED TRANSPORT LAYER PROTOCOL FOR WIRELESS MEDIUM

RELATED APPLICATION

This application claims priority from U.S. Provisional patent application Ser. No. 60/568,506, filed May 5, 2004.

FIELD OF INVENTION

This invention relates generally to wireless access to information systems and the internet, and more specifically relates to a method for improving the Transmission Control Protocol (TCP) for wireless media.

BACKGROUND OF INVENTION

Wireless access to information systems and the Internet is becoming mandatory for businesses that provide online services. Businesses require that the existing online services and applications be available to any wireless client. Most applications, whether designed to use over wired or wireless networks, rely on the TCP protocol for reliable transport (F. M. Anjuman and L. Tassiulas, "On the Behavior of Different TCP Algorithms Over A Wireless Channel," 155-165, Atlanta, May 1999. ACM Sigmetrics.) Since these applications are TCP-based, wireless clients need to support some type of reliable transport to interface with these applications seamlessly.

TCP is designed for operation in wired networks, where random packet losses due to transmission errors are negligible. It is well known that TCP performs poorly over wireless links, which suffer from packet losses due to the error-prone and idiosyncratic nature of the wireless medium. TCP does not adapt well to wireless communications, as it interprets the packet losses as being caused by network congestion. In addition, acknowledgement and retransmission schemes used in TCP unnecessarily consume network bandwidth. (H. Balakrishnan, V. N. Padmanabhan, S. Seshan, and R. H. Katz, "A Comparison Of Mechanisms For Improving TCP Performance Over Wireless Links," *IEEE/ACM Transactions on Networking*, June 1997.); (R. W. Lucky, "Improving Reliable Transport And Handoff Performance In Cellular Wireless Networks," *ACM Wireless Networks*, 14, Dec. 1995.); (R. Caceres and L. Iftode, "Improving Reliable Transport Protocols In Mobile Computing Environment," *IEEE JSAC*, 1994.)

Yet another problem arising from the conventional TCP relates to power consumption.

Hand-held devices coupled with wireless network interfaces are emerging as a new way to achieve seamless connectivity while adhering to stringent power and size constraints. The measurement-based results clearly indicate that the power drained by the network interface constitutes a large fraction of the total power used by the PDA. Simulation results show that the predominant cost comes not from the number of packets sent or received by a particular transport protocol, but from the amount of time the network interface is in an idle state. The energy cost can increase significantly in the presence of wireless losses, since a receiver must wait for a TCP sender to recover from packet losses.

The loss-intensive wireless communication results in high retransmission rates and bandwidth consumption. In addition, retransmitted segments have a significant chance of being dropped.

A number of efforts have been made to tune the TCP protocol for wireless medium. Each of them addresses different aspects of the problem and provides solutions specific to that. Major efforts are identified below:

Snoop TCP

This solution addresses the problem associated with TCP congestion control algorithm. When packet loss is detected (duplicate acknowledgement or local timeout), snoop retransmits the lost packet, hiding the fixed host (FH) from duplicate acknowledgements, and thereby preventing congestion control from kicking in. The down side is that each base station has to be updated with the snoop module (R. Caceres and L. Iftode, "Improving Reliable Transport Protocols In Mobile Computing Environment," *IEEE JSAC*, 1994).

Wireless Profiled TCP

This particular technique is used in commercially available wireless application protocol and its focus is mostly on "initial window size" adjustment to avoid the burden of the "Slow Start" phase of TCP. This approach introduces "Explicit Congestion Notification" to handle congestion control.

Link Layer Retransmission

Reliability of TCP demands retransmission of lost segments. Depending on the error rate of the wireless channel, the retransmission of lost segments may cause higher BDP (Bandwidth-Delay Product) and bandwidth consumption. If the retransmission can occur in the RLC (radio link control) layer, the smaller size PDUs (packet data units) get retransmitted. This can improve the bandwidth degradation and loss rate (FER—forward error correction) of the communication channel. Unfortunately, this technique suffers from high jitter and BDP (Jonathon Stone and Craig Patridge, "When The CRC and TCP Checksum Disagree. ACM SIGCOMM," September 2000; ("TCP Over 2.5 G and 3G Wireless Networks Draft-ietf-pilc-2.5g3g-03".)

The first two techniques above described, Snoop TCP and Wireless Profiled TCP, do not address the deeply routed cause of retransmission. Instead, they focus on how to adapt to the excessive packet loss and retransmission. The Link Layer Retransmission technique attempts to address the root cause, but does not handle it in the best way. Accordingly, among the objects of the present invention are (1) to bring down the packet loss rate; (2) to achieve finer control over retransmission; (3) to achieve sophisticated flow control tuned for a lossy environment; and (4) to enhance the latency, throughput, bandwidth conservation and power savings.

SUMMARY OF INVENTION

In accordance with the present invention, a new TCP segment structure is provided that enables successful wireless communications. The invention enables the use of TCP protocol for reliable transport of data over a wireless network, resolving the problems associated with frequent packet loss. Additional benefits include delivery of significant performance improvement, bandwidth saving and backward compatibility compared to the wire-line TCP protocol; and contribution to power savings in wireless handsets and devices.

To make the retransmission process more granular, transport layer segments (540 bytes by default) are subdivided into sub-segments. The invention utilizes a split TCP based approach and produces a series of smaller-sized segments that share the same transport layer header. The NACK-based message exchange, new header format and a special windowing protocol are adapted to achieve reliability, flow-control, and efficient buffer handling. (NACK refers to a new ACK, i.e. an ACK that acknowledges outstanding data.)

DESCRIPTION OF DRAWINGS

In the drawings appended hereto:

FIG. 4 illustrates the transport layer segment divided into a series of sub-segments, each sub-segment sharing the same transport layer heading;

DESCRIPTION OF PREFERRED EMBODIMENT

Sub-Segmentation

Figures 1, 2:
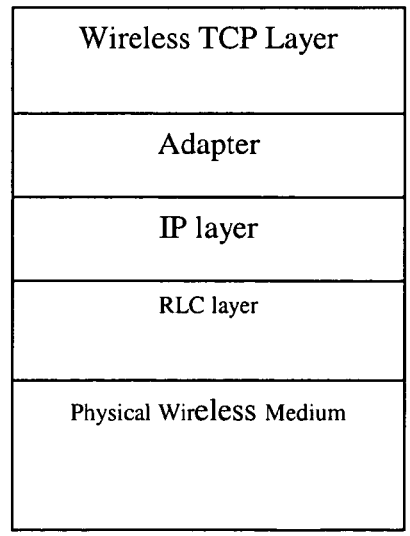
FIG. 1 is a schematic depiction of a sub-segment structure in accordance with the present invention.
FIG. 2 is a schematic depiction of a protocol stack used in the invention.

Referring to FIGS. 1 and 2, the Transport layer protocol that is specially designed for the wireless medium uses the concept of sub-segmentation—the Transport layer segment is divided into a header and a series of sub-segments. Each sub-segment is as small as one RLC (radio link control) PDU payload (roughly 40 bytes for WCDMA [wideband code division multiple access]) and carries (1) the checksum of the TCP header as correlation ID to associate the transport layer header with a sub-segment—the checksum is unique for each PDU in the context of destination, source, sequence number, etc.; (2) the checksum for itself to detect the corruption of the sub-segment; (3) the corresponding sub-segment number, which is unique in the context of a segment; and (4) the data payload.

The overhead size of each sub-segment is less than 10%.

The rationale for selecting this approach is as follows. A standard TCP packet (each approximately 540 bytes in size, by default) must undergo the time-consuming fragmentation and reassembly process over the wireless medium (each PDU is roughly 40 bytes in size). At the same time, if one of the PDUs carrying the TCP segment is corrupted, standard TCP retransmits the entire TCP segment to recover from the error. The probability that the retransmitted segment will be dropped is relatively high. This results in latency increase of the TCP segment and unnecessary bandwidth consumption.

Though the sub-segmentation approach has time delays associated with the reassembly of smaller sized sub-segments, it improves the latency and bandwidth consumption. Since the sub-segments are smaller in size, they do not have to go through further fragmentation and reassembly at the IP layer. Thus, the reassembly delay in the Transport layer is compensated. In addition, since the Transport layer protocol only retransmits specific sub-segments to recover from the losses, the associated time delay to recover from the losses is less compared to the standard TCP. This approach thus decreases latency and reduces bandwidth consumption.

As seen in FIG. 2, the protocol stack of the invention consists of the following layers:

1) Physical Wireless Medium: Carries the headers and data from upper layers in the form of an electromagnetic wave.

2) RLC Layer: Encapsulates the headers and data from the upper layer into a link layer frame structure, and is protected by "Forward Error Correction."

3) IP Layer: The IP layer is responsible for routing the PDUs attached with IP headers. This layer keeps track of the presence of any adapter layer. If the adapter layer is present, IP layer calls back the adapter layer appropriately. Otherwise, the packets in IP layer will move up to the transport layer once it is done with the IP layer.

4) Adapter Layer: This identifies the appropriate IP header associated with a transport layer sub-segment. The adapter layer caches the IP and the transport layer related header of a segment until its successful arrival is complete. This layer uses the correlation ID associated with each sub-segment to determine the corresponding IP header and the transport layer protocol header. Checksum of the TCP header is used as the correlation ID. The adapter layer allows any other transport layer protocols (such as UDP) to work directly on the standard IP layer. The IP layer communicates with the adapter layer via callback, and the adapter layer has to be pre-registered with the IP layer to make the proposed protocol work.

5) Wireless TCP Layer: This layer provides reliability, duplicate handling, message ordering, and flow control, based on the use of sub-segments.

The adapter layer helps the protocol implementation to live with other transport layer protocols e.g. TCP, UDP. The location of the adapter layer is selected carefully. As an alternative, if the adapter layer is placed over the RLC layer, the IP layer will attach the IP header to all the packets that pass through it. If the IP packet carries the transport layer PDUs, the adapter layer has to read the IP header again to delete the attached IP header. This is an unnecessary overhead for all other protocols.

Figure 3:
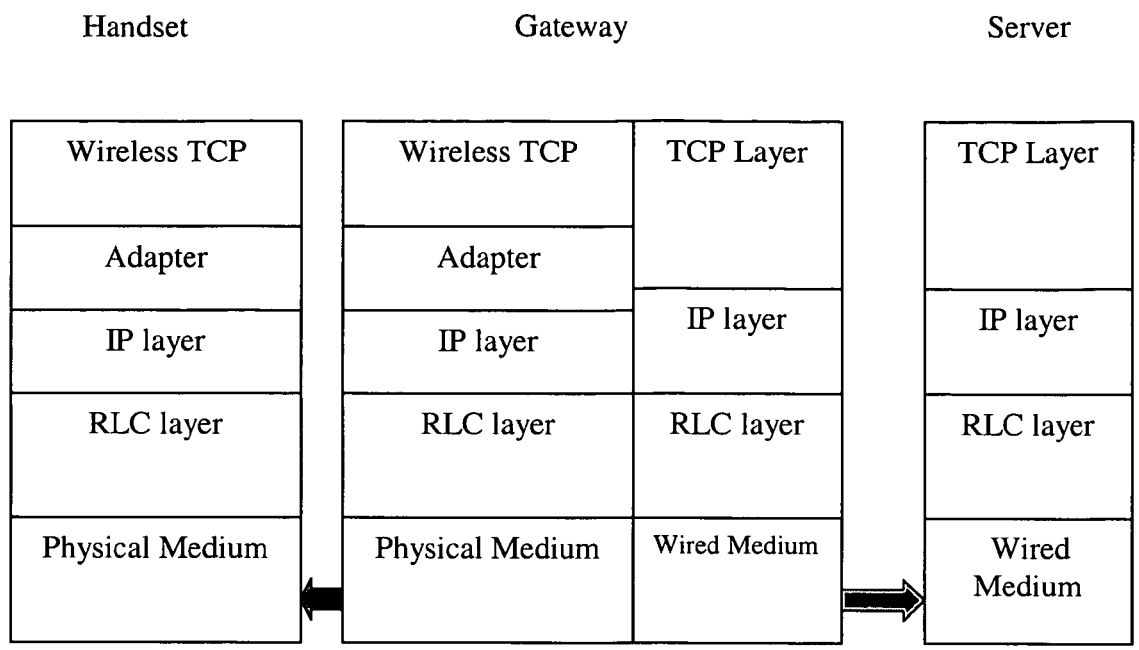
FIG. 3 is a schematic depiction of the split TCP approach used in the invention.
Figure 5:
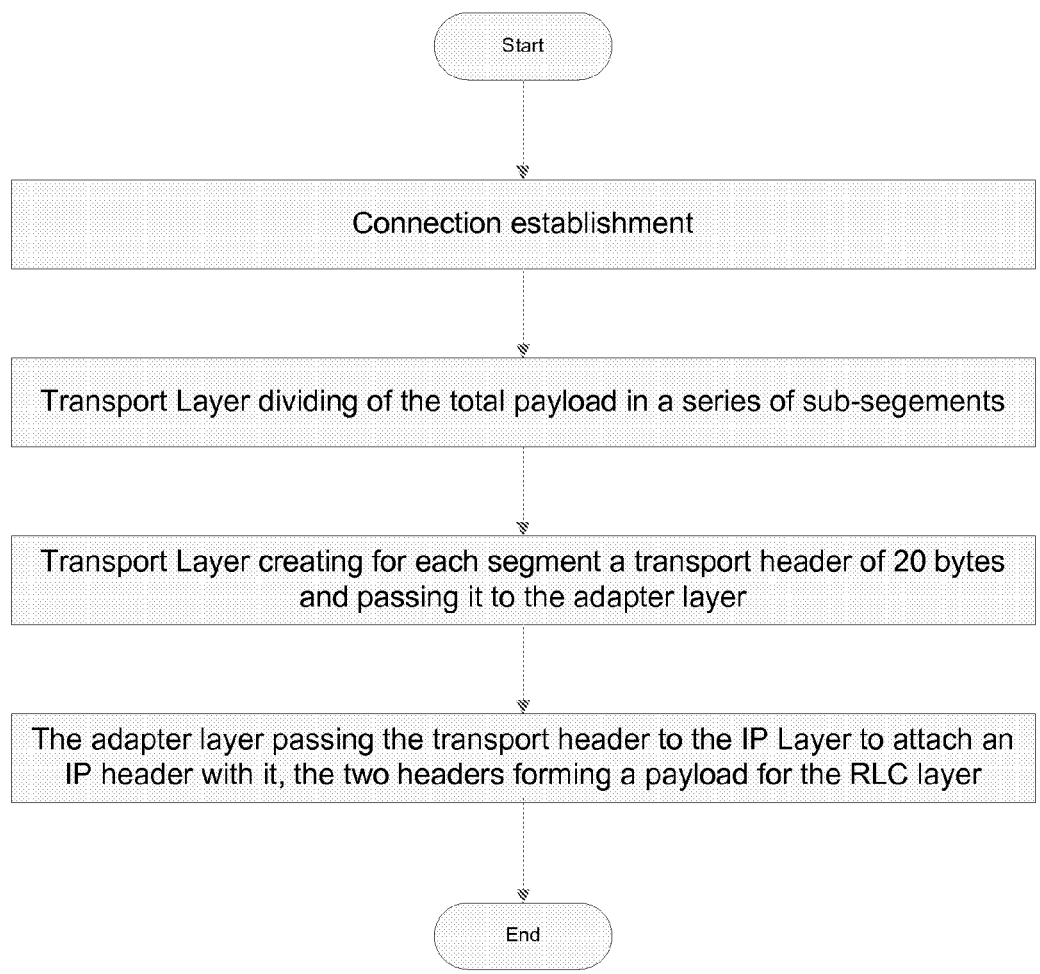
FIG. 5 illustrates the sequence involved with the process of sending transport layer PDU.
Figure 6:
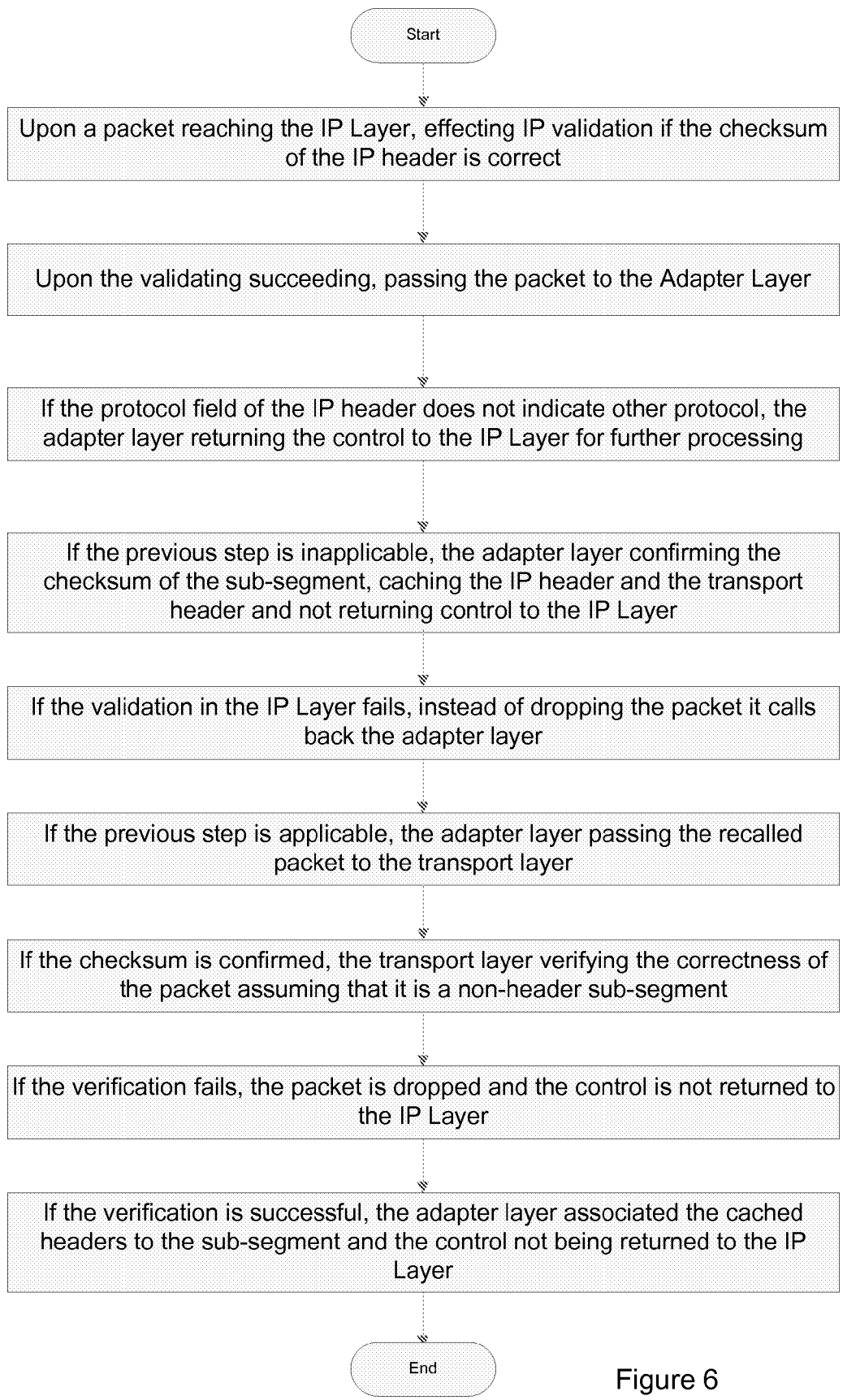
FIG. 6 illustrates the action sequence involved with the process of receiving transport layer PDU.
Figure 7:
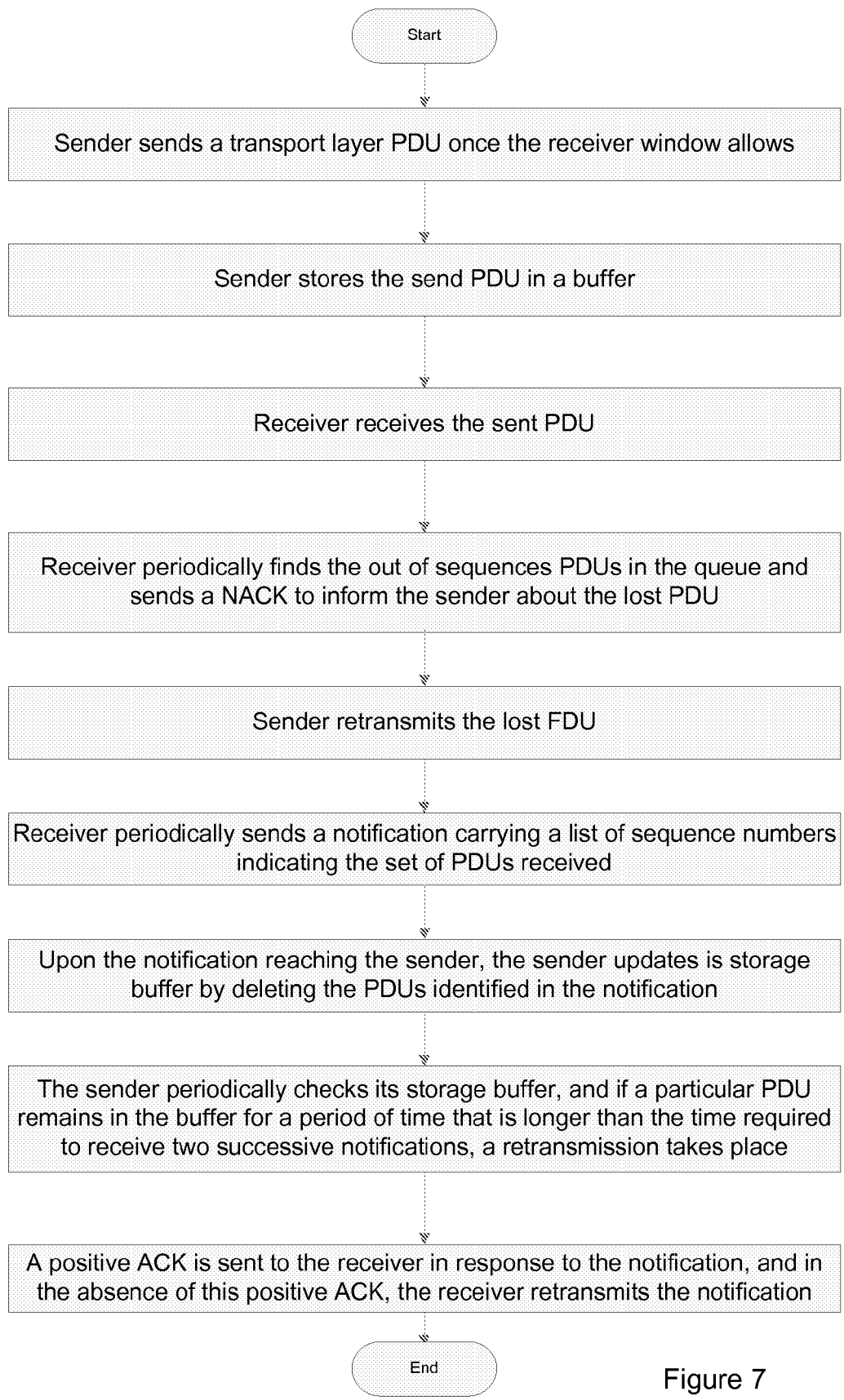
FIG. 7 illustrates a steps involved in a three-way handshake that is used for connection establishment.

FIG. 3 depicts a protocol stack employing the split TCP approach.

FIG. 3 schematically represents the way split TCP approach is deployed. There are two pieces of connections used to link the mobile host and the fixed host. The mobile host contains the protocol stack of the invention and the fixed host still maintains the old TCP stack. The intermediary (e.g. base station or gateway) carries both the above mentioned stacks and map the semantics of both the protocols. The mapping details are not per se of the present invention.

Sending and Receiving of Transport Layer Segments Via the Use of Sub-Segments

FIGS. 1 and 2 represent the protocol stacks and the sub-segments used in these processes The Sending Process The preferred action sequence of steps involved with the process of sending transport layer PDU is as follows:

(1) Connection establishment.

(2) The transport layer divides the total payload in series of sub-segments. The structure of a representative sub-segment is as shown in FIG. 1. Twelve sub-segments together form a virtual transport layer segment. Since each sub-segment is equivalent to a RLC PDU (40 bytes), twelve of them will create a virtual transport layer segment (approximately 540 bytes). This virtual segment is the same in size as a standard TCP segment and this facilitates the mapping of the protocol to the standard TCP.

(3) For each segment, the transport layer creates a transport header of 20 bytes and passes it to the adapter layer.

(4) The adapter layer passes the transport header to the IP layer to attach an IP header with it. Those two headers together form a payload for the RLC layer.

(5) For other sub-segments, the adapter layer tunnels through the IP layer and directly passes the sub-segment to the link layer.

The Receiving Process

The preferred action sequence of steps involved with the process of receiving transport layer PDUs is as follows:
(1) When a packet reaches the IP layer, IP validation results if the checksum of IP header is correct.
(2) Once the validation is successful, it passes the packet to the adapter layer.
(3) If the "protocol field" of the IP header does not indicate other protocols, the adapter layer returns the control to the IP layer for further processing.
(4) Otherwise, the adapter layer confirms the checksum of the sub-segment, and in a presently preferred protocol caches the IP header and the transport header and does not return the control to IP layer.
(5) If validation in the IP layer fails, instead of dropping the packet it calls back the adapter layer.
(6) The adapter layer passes the packet to the transport layer.
(7) If the checksum is confirmed, the transport layer verifies the correctness of the packet assuming that it is a non-header sub-segment.
(8) If the verification fails, the packet will be dropped and the control will not be returned to the IP layer.
(9) If the verification is successful, the adapter layer associates the cached headers to the sub-segment and the control will not be returned to the IP layer.

NACK-Based Interaction

A three-way handshaking, like TCP, is preferably used for the connection establishment. The flow, based on the proposed protocol, is as follows.
(1) Sender sends a transport layer PDU once the receiver window allows.
(2) Sender stores the sent PDU in a buffer.
(3) Receiver receives it.
(4) Receiver periodically finds the out-of-sequence PDUs in the queue and sends a NACK to inform the sender about the lost PDU. Loss of NACK can be handled via this mechanism. The time period should be selected carefully. In practice, this parameter should be the service rate of the receiver application provided the sum of the time required to send a NACK from the receiver to the sender and the time required to send a retransmitted segment in response to that is smaller than the service rate. Otherwise, this interval should be twice the propagation delay. The time stamp present in each header can notify the changes in the round trip time mentioned above. This helps the protocol to adapt to the changes related to round trip time. Usually, it may vary due to delay in channel allocation.
(5) Sender retransmits the lost PDU.
(6) Receiver periodically sends a notification carrying a list of sequence numbers. The sequence numbers indicate the set of PDUs received at the receiving end. Once the notification reaches the sender, the sender should update its storage buffer by deleting the PDUs identified in the notification. The frequency at which notifications are sent should be configurable depending on the buffer space available at the sender. This frequency must be significantly higher than the frequency of sending NACK.
(7) The sender periodically checks its storage buffer. If a particular PDU remains in the buffer for a period of time that is longer than the time required to receive two successive notifications, a retransmission should take place. This step handles the loss of the last/first PDU even in the case when the notification is lost. The time period of checking the sender's buffer is the same as the time required to receive two successive notifications at the sender's end.
(8) A positive ACK will be sent to the receiver in response to the notification. In the absence of this positive ACK, the receiver should retransmit the notification.

When the first PDU arrives, a notification should be sent immediately to avoid the unnecessary delay caused by the loss of the first segment. Otherwise, since this protocol needs the message ordering, all the successive PDUs will be stuck at the receiver buffer. This protocol provides total reliability, equivalent to the standard TCP protocol.

Use of NACK is required for the fast recovery of the lost segment. Notification is required for cleaning up the occupied storage buffer at the sender side and guarantee of the receipt of arrival from the receiver side.

This is a windowing protocol. Each sender sends only a limited number of PDUs (constrained by the available window space), which helps with the flow control.

Buffer Management

To provide a better buffer management, the following scheme can be used.
(1) A separate variable should maintain the identifier of the next missing sub-segment, including the sequence number and the sub-sequence number.
(2) A second variable should be created to keep track of the sequence and sub-sequence number of the last sub-segment removed by the application from the receiver TCP buffer.
(3) The process of receiving TCP segments and the reading of application data from receiver buffer go simultaneously. An application process reads the data from the receiver buffer starting from the sub-segment that is next to the segment indicated by the second variable mentioned. The application process continues reading until it reaches the sub-segment directly before the sub-segment referred to in the first variable mentioned. The read operation also frees up the buffer. This ensures that the receiver process will sort a smaller sized receiver buffer to identify the missing sub-segments. The variables have to be updated when a read operation is done.
(4) To further improve the sorting process, every block of consecutive sub-segments can be mapped to single logical entity after the sorting takes place on a comparatively smaller set. Each entity should have a lower bound and upper bound corresponding to the $1^{st}$ and last sub-segment of the block. When more sub-segments arrive, the next sort will occur over those few logical entities and newly arrived sub-segments. A new sub-segment should be greater or less than a logical entity (as mentioned before) if it is greater or less than the upper and lower bound of the entity respectively. The sub-segment is duplicate if it falls between the lower and upper bound.

Windowing Mechanism

The windowing mechanism preferably used is specifically designed for wireless medium. Instead of a sliding window protocol, where the sender's window carries the unacknowledged messages, this mechanism separates the flow control of the unacknowledged messages from those that are about to be sent. This windowing mechanism helps to avoid a reduction in message flow rate at the sender end due to the loss of NACK from the receiver side. The loss of NACK does not necessarily imply that the sent PDUs are lost, and reduction in the message flow rate is not always appropriate. On the other hand, if the retransmission rate is neglected in comparison to the transmission rate transport layer PDUs have to wait unnecessarily at the receiver end buffer until the missing transport layer PDUs arrive. The sender's windowing rate should only be impacted by the service rate of the receiver's application.

The window message protocol is a rate-based windowing protocol. The receiver indicates it's current service rate through the NACK header. If the sender application sends the data at a higher rate, a sender side queue of finite size should maintain the data to reduce the sending rate to the receiver's service rate. Even the transport layer PDUs that are unacknowledged and need to be retransmitted must go through the same process of rate-based flow control. The following are the features of this protocol:

(1) The windowing rate does not change for packet corruption.

(2) The windowing rate changes when a receiver becomes slow (not for the packet corruption).

(3) The change in the rate gets propagated via the NACK headers, which carry a field for window rate and a field indicating the proportion of service rate granted for original transmission.

(4) A logically separate buffer space should be dedicated for the unacknowledged messages. This storage supplies the transport layer PDUs for the retransmission.

(5) The windowing algorithm steps are as follows:
  (a) Sender posts a Transport layer PDU onto the queue designated for the original PDUs at the sender side.
  (b) Sender determines the receiver's servicing rate and the proportion granted for original Transport layer PDUs from the acknowledgement headers received from the receiver.
  (c) Sender reads the PDUs from the queue and sends the data to the receiver at the rate indicated by the acknowledgement headers from the sender.
  (d) Steps (a) through (c) are repeated for the retransmitted messages.
  (e) The sender processes round robin between two sender side queues to avoid any unnecessary delay either in transmission queue or in the retransmission queue.

Two desirable options for deploying the disclosed invention are
  (a) deploy the protocol implementation at the handset and at the base stations.

The protocol can be used over an IP bearer service. This introduces seamless IP based packet switched environment for wireless applications. Among the resulting benefits are: (1) that wireless service providers can use this technique to preserve bandwidth; (2) improvement in latency helps to increase the usage of more and more wireless data services; and (3) since this solution helps in power savings, mobile handset makers may have special incentives to adapt this solution.

(b) Deploy the protocol implementation at the handset and at the individual protocol gateway This option helps to avoid wide deployment of the protocol in every base station. Referring to FIG. 3, it will be appreciated that by using the protocol gateway address (e.g. phone number), any communication between the handset and the fixed host can be divided into two pieces. Handset and the gateway use the proposed protocol to talk over non-IP bearer (e.g. GPRS) services and the gateway extends this communication to any fixed host over the IP network.

The invention can readily be implemented by existing mobile handset companies. Handset companies can market faster access to wireless-TCP based services without any cooperation from large service providers. It may be noted that at least one mobile handset company (Nokia) already uses the gateway-based approach to support WAP protocol.

Test Results

The efficacy of the present method was established by running simulations for several different error rates. Two illustrative error rates are presented here.

TABLE 1

Comparison of Throughputs Derived From Simulation

| Error Rate | Throughput/Sub-Segment(Kbps) | Throughput/Segment(Kbps) |
|---|---|---|
| 4 | 29.9860 | 8.960003 |
| 5 | 27.1939 | 6.343242 |

TABLE 2

Comparison of Latency Derived From Simulation

| Error Rate | Latency/Sub-Segment | Latency/Segment |
|---|---|---|
| 4 | 0.009401 | 0.03553 |
| 5 | 0.009901 | 0.0482 |

While the present invention has been described in terms of specific embodiments thereof, it will be understood in view of the present disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

The invention claimed is:

1. A method for improving the transmission control protocol (TCP) for wireless media comprising:
   dividing a transport layer segment into a header and a series of sub-segments using at least one communications device, each sub-segment sharing a transport layer header; each sub-segment carrying (1) a checksum of the transport layer header as a correlation ID to associate the transport layer header with a sub-segment; (2) a checksum for itself to detect corruption of the sub-segment; and (3) a corresponding sub-segment number, which is unique in the context of a segment; and
   sending a transport layer Payload Data Unit (PDU) comprising at least one sub-segment across the wireless media.

2. A method in accordance with claim 1, wherein an overhead size of each sub-segment is less than ten percent.

3. A method in accordance with claim 1, wherein each sub-segment can be as small as one Radio Link Control (RLC) Payload Data Unit (PDU).

4. A method for improving the transmission control protocol (TCP) for wireless media, said method comprising:
   dividing a transport layer segment into a header and a series of sub-segments using at least one communications device, each sub-segment sharing a transport layer header; each sub-segment carrying (1) a checksum of the transport layer header as a correlation ID to associate the transport layer header with a sub-segment; (2) a checksum for itself to detect corruption of the sub-segment; and (3) a corresponding sub-segment number, which is unique in the context of a segment; and
   sending a transport layer Payload Data Unit (PDU) comprising at least one sub-segment across the wireless media, wherein the multilayer protocol stack comprises:
a physical wireless medium layer for carrying headers and data from upper layers in the form of an electromagnetic wave;
an RLC layer for encapsulating the headers and data from the upper layers into a link layer frame structure, and for use in forward error correction;
an IP layer for routing the PDUs attached with IP headers;
an adapter layer for identifying an appropriate IP header associated with a transport layer sub-segment and caching the IP layer and the transport layer related header of a segment until a successful arrival of the IP and transport layer related header is complete; and
a wireless TCP layer for providing reliability, duplicating handling, message ordering, and flow control, based at least in part on the use of sub-segments,
wherein the IP Layer is configured to interact with the adapter layer before moving packets in the IP layer up to the transport layer.

5. A method in accordance with claim 4, wherein the adapter layer uses a correlation ID associated with each sub-segment to determine a corresponding IP header and the transport layer protocol header.

6. A method in accordance with claim 5, wherein the checksum of the transport layer header is used as the correlation ID.

7. A method in accordance with claim 5, wherein the IP layer communicates with the adapter layer via callback and the adapter layer is pre-registered with the IP layer.

8. A method in accordance with claim 4, wherein sending the transport layer PDU comprises:
establishing a connection;
dividing, by a transport layer, a total payload into a series of sub-segments;
creating, by the transport layer, for each segment a transport header of 20 bytes and passing it to an adapter layer; and
the adapter layer passing the transport header to an IP layer to attach an IP header with the transport header, the two headers together forming a payload for a RLC layer.

9. A method in accordance with claim 8, wherein twelve sub-segments together form a virtual transport layer segment, each sub-segment being equivalent to an RLC PDU of 40 bytes, wherein twelve of the sub-segments create a virtual transport layer segment of approximately 540 bytes, and wherein the virtual segment is the same in size as a standard TCP segment to facilitate in mapping to a standard TCP.

10. A method in accordance with claim 8, wherein for other sub-segments, the adapter layer tunnels through the IP layer and directly passes the sub-segment to a link layer.

11. A method in accordance with claim 4, further comprising receiving transport layer PDUs, wherein said receiving comprises:
upon a packet reaching an IP layer, in response to determining that the checksum of an IP header is correct, validating, at the IP layer, the packet I;
upon the validation succeeding, the IP layer passing the packet to an adapter layer;
in response to determining that a protocol field of the IP header does not indicate other protocols, returning, at the adapter layer, control to the IP layer for further processing;
in response to determining that the adapter layer returning the control to the IP layer for further processing is inapplicable;
confirming, by the adapter layer, the checksum of the sub-segment; and
caching, by the adapter layer, the IP header;
in response to determining that the validation in the IP layer failed, calling back the adapter layer instead of dropping the packet;
in response to determining that calling back the adapter layer is applicable, passing, by the adapter layer, a recalled packet to a transport layer;
in response to confirming the checksum, verifying, by the transport layer, the correctness of the packet assuming that it is a non-header sub-segment;
in response to determining verification failure, dropping the packet; and
in response to determining that verification was successful, associating, by the adapter layer, cached headers to the sub-segment.

12. A method for improving the transmission control protocol (TCP) for wireless media, comprising:
dividing a transport layer segment into a header and a series of sub-segments, each sub-segment sharing a transport layer header; each sub-segment carrying (1) a checksum of the transport layer header as a correlation ID to associate the transport layer header with a sub-segment; (2) a checksum for itself to detect corruption of the sub-segment; and (3) a corresponding sub-segment number, which is unique in the context of a segment;
sending a transport layer Payload Data Unit (PDU) comprising at least one sub-segment across the wireless media once a receiver window allows;
storing the sent PDU in a buffer;
receiving a NACK providing information about a lost PDU from a receiver finding a periodic out-of-sequence PDU in a queue;
retransmitting the lost PDU;
receiving a periodic notification including a list of sequence numbers indicating a set of PDUs received by the receiver;
updating a storage buffer by deleting the PDUs identified in the notification;
periodically checking the storage buffer, and if a particular PDU remains in the buffer for a period of time that is longer than the time required to receive two successive notifications, retransmitting the particular PDU; and
sending a positive ACK to the receiver in response to the notification.

13. An apparatus, comprising:
means for dividing a transport layer segment into a header and a series of sub-segments, each sub-segment sharing a transport layer header; each sub-segment carrying (1) a checksum of the transport layer header as a correlation ID to associate the transport layer header with a sub-segment; (2) a checksum for itself to detect corruption of the sub-segment; and (3) a corresponding sub-segment number, which is unique in the context of a segment; and
means for sending a transport layer Payload Data Unit (PDU) comprising at least one sub-segment across the wireless media.

* * * * *

UNITED STATES PATENT AND TRADEMARK OFFICE
CERTIFICATE OF CORRECTION

| | | |
|---|---|---|
| PATENT NO. | : 7,965,674 B2 | Page 1 of 1 |
| APPLICATION NO. | : 11/121153 | |
| DATED | : June 21, 2011 | |
| INVENTOR(S) | : Sengupta et al. | |

It is certified that error appears in the above-identified patent and that said Letters Patent is hereby corrected as shown below:

On the Title page, item (56), under "Other Publications", in Column 2, Line 1, delete "mechanism" and insert -- mechanisms --.

On the Title page, item (56), under "Other Publications", in Column 2, Line 7, delete "Probablity" and insert -- Probability --.

On the Title page, item (56), under "Other Publications", in Column 2, Line 8, delete "Recevers" and insert -- Receivers --.

Column 8, line 36, in Claim 1, delete "media" and insert -- media, --.

Column 9, line 57, in Claim 11, delete "packet I;" and insert -- packet; --.

Column 10, lines 2-3, in Claim 11, delete "inapplicable;" and insert -- inapplicable: --.

Signed and Sealed this
Eleventh Day of October, 2011

David J. Kappos
*Director of the United States Patent and Trademark Office*